(12) United States Patent
Vasseur et al.

(10) Patent No.: US 10,044,741 B2
(45) Date of Patent: Aug. 7, 2018

(54) INFORMATION REPORTING FOR ANOMALY DETECTION

(71) Applicant: Cisco Technology, Inc., San Jose, CA (US)

(72) Inventors: Jean-Philippe Vasseur, Saint Martin d'uriage (FR); Sukrit Dasgupta, Norwood, MA (US); Thomas Reuther, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/632,993

(22) Filed: Jun. 26, 2017

(65) Prior Publication Data

US 2017/0310695 A1    Oct. 26, 2017

Related U.S. Application Data

(62) Division of application No. 14/604,570, filed on Jan. 23, 2015, now Pat. No. 9,722,906.

(51) Int. Cl.
*H04L 12/26* (2006.01)
*H04L 29/06* (2006.01)

(52) U.S. Cl.
CPC ........ *H04L 63/1425* (2013.01); *H04L 43/022* (2013.01); *H04L 43/062* (2013.01); *H04L 43/12* (2013.01); *H04L 63/1416* (2013.01)

(58) Field of Classification Search
CPC ....... H04L 43/04; H04L 43/12; H04L 43/022; H04L 43/062; H04L 63/00

USPC ................................................. 370/216-258
See application file for complete search history.

(56) References Cited

U.S. PATENT DOCUMENTS

| | | | | | |
|---|---|---|---|---|---|
| 5,367,523 | A | * | 11/1994 | Chang | H04L 47/10 370/235 |
| 7,130,268 | B2 | * | 10/2006 | Mascolo | H04L 43/0882 370/232 |
| 7,961,621 | B2 | * | 6/2011 | Bergamasco | H04L 47/10 370/236 |
| 2008/0239956 | A1 | * | 10/2008 | Okholm | H04L 47/10 370/232 |
| 2009/0003204 | A1 | * | 1/2009 | Okholm | H04L 47/10 370/230 |
| 2009/0161547 | A1 | * | 6/2009 | Riddle | G06F 9/526 370/236 |
| 2013/0155858 | A1 | * | 6/2013 | Chen | H04L 47/10 370/235 |
| 2016/0057061 | A1 | * | 2/2016 | Avci | H04L 47/125 370/235 |

* cited by examiner

*Primary Examiner* — Thai Hoang
(74) *Attorney, Agent, or Firm* — Parker Ibrahim & Berg LLP; James M. Behmke; Stephen D. LeBarron

(57) ABSTRACT

In one embodiment, a first device in a network receives traffic flow data from a plurality of devices in the network. The traffic flow data from at least one of the plurality of devices comprises raw packets of a traffic flow. The first device selects a set of reporting devices from among the plurality of devices based on the received traffic flow data. The first device provides traffic flow reporting instructions to the selected set of reporting devices. The traffic flow reporting instructions cause each reporting device to provide sampled traffic flow data to an anomaly detection device.

9 Claims, 14 Drawing Sheets

INFORMATION REPORTING FOR ANOMALY DETECTION

RELATED APPLICATION

This application is a Divisional application of U.S. patent application Ser. No. 14/604,570, filed on Jan. 23, 2015, the entire content of which is incorporated herein.

TECHNICAL FIELD

The present disclosure relates generally to computer networks, and, more particularly, to information reporting techniques for anomaly detection in a computer network.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
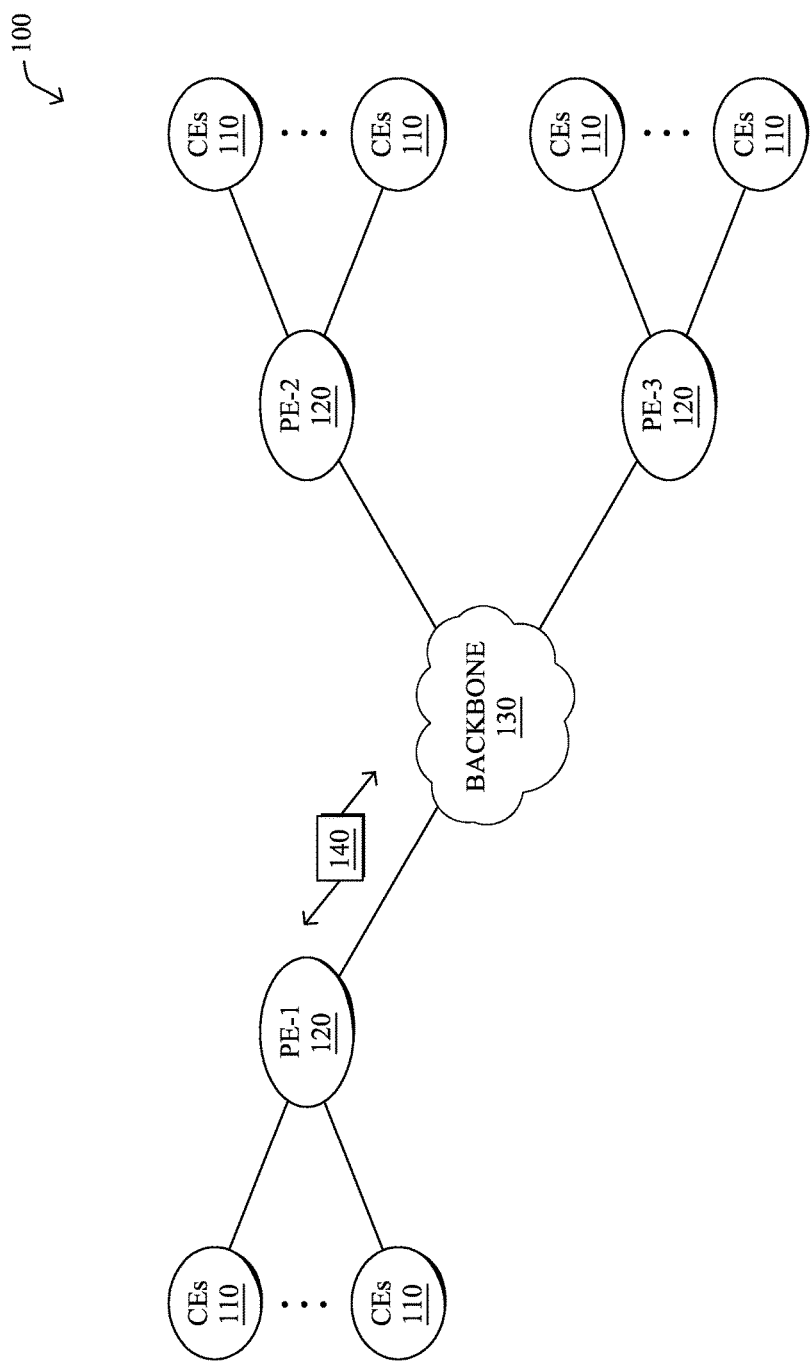
FIGS. 1A-1B illustrate an example communication network.

According to one or more embodiments of the disclosure, a first device in a network receives traffic flow data from a plurality of devices in the network. The traffic flow data from at least one of the plurality of devices comprises raw packets of a traffic flow. The first device selects a set of reporting devices from among the plurality of devices based on the received traffic flow data. The first device provides traffic flow reporting instructions to the selected set of reporting devices. The traffic flow reporting instructions cause each reporting device to provide sampled traffic flow data to an anomaly detection device.

In further embodiments, a first device in a network provides capability data to a second device in the network. The capability data is indicative of whether the first device is operable to generate summarized traffic flow records. The first device receives a request for traffic flow data from the second device based on the capability data. The first device provides the requested traffic flow data to the second device, in response to receiving the request for the traffic flow data. The first device receives a traffic flow reporting instruction from the second device based on the traffic flow data provided to the second device. The traffic flow reporting instruction causes the first device to report sampled traffic flow data to an anomaly detection device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement (SLA) characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
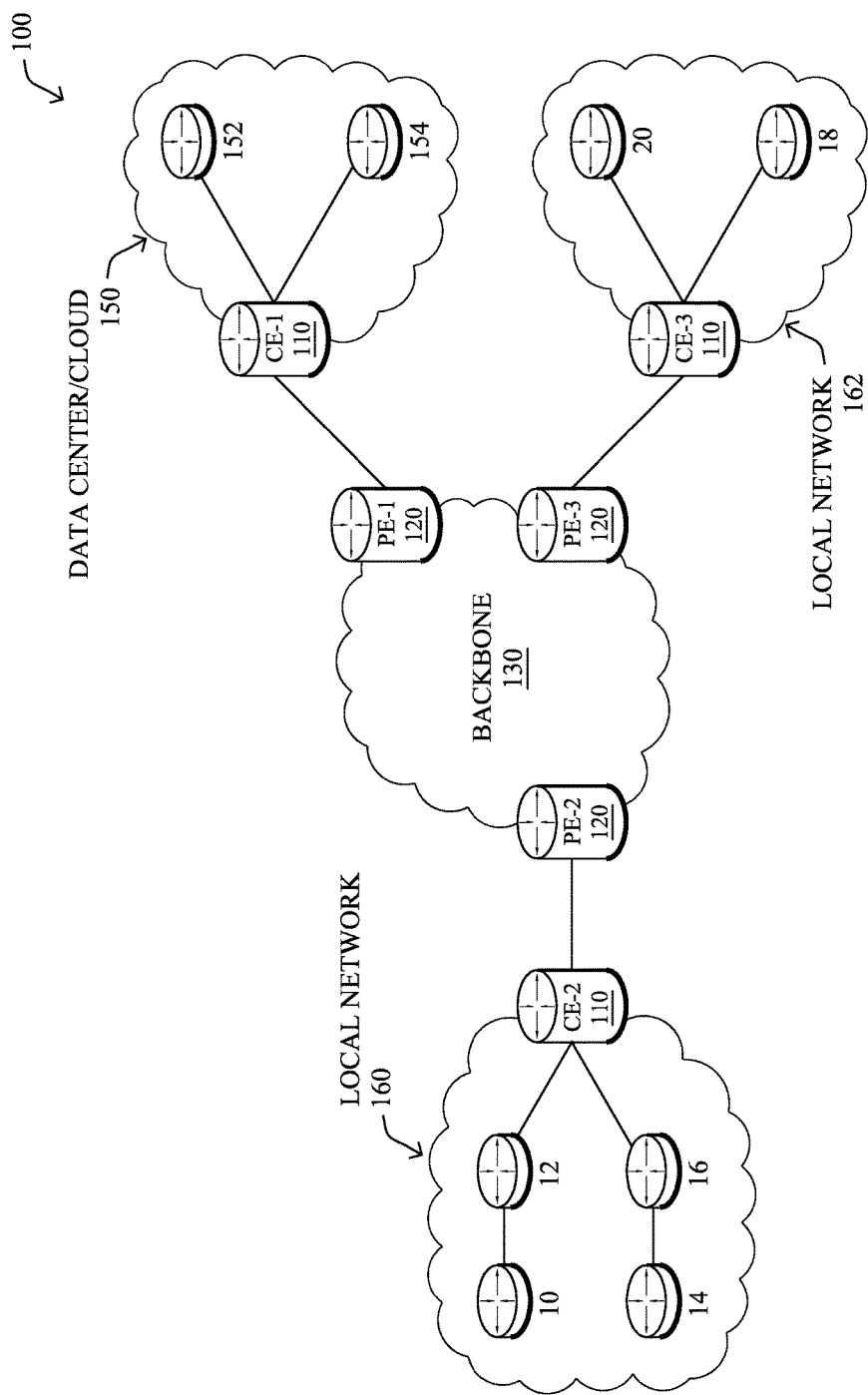

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
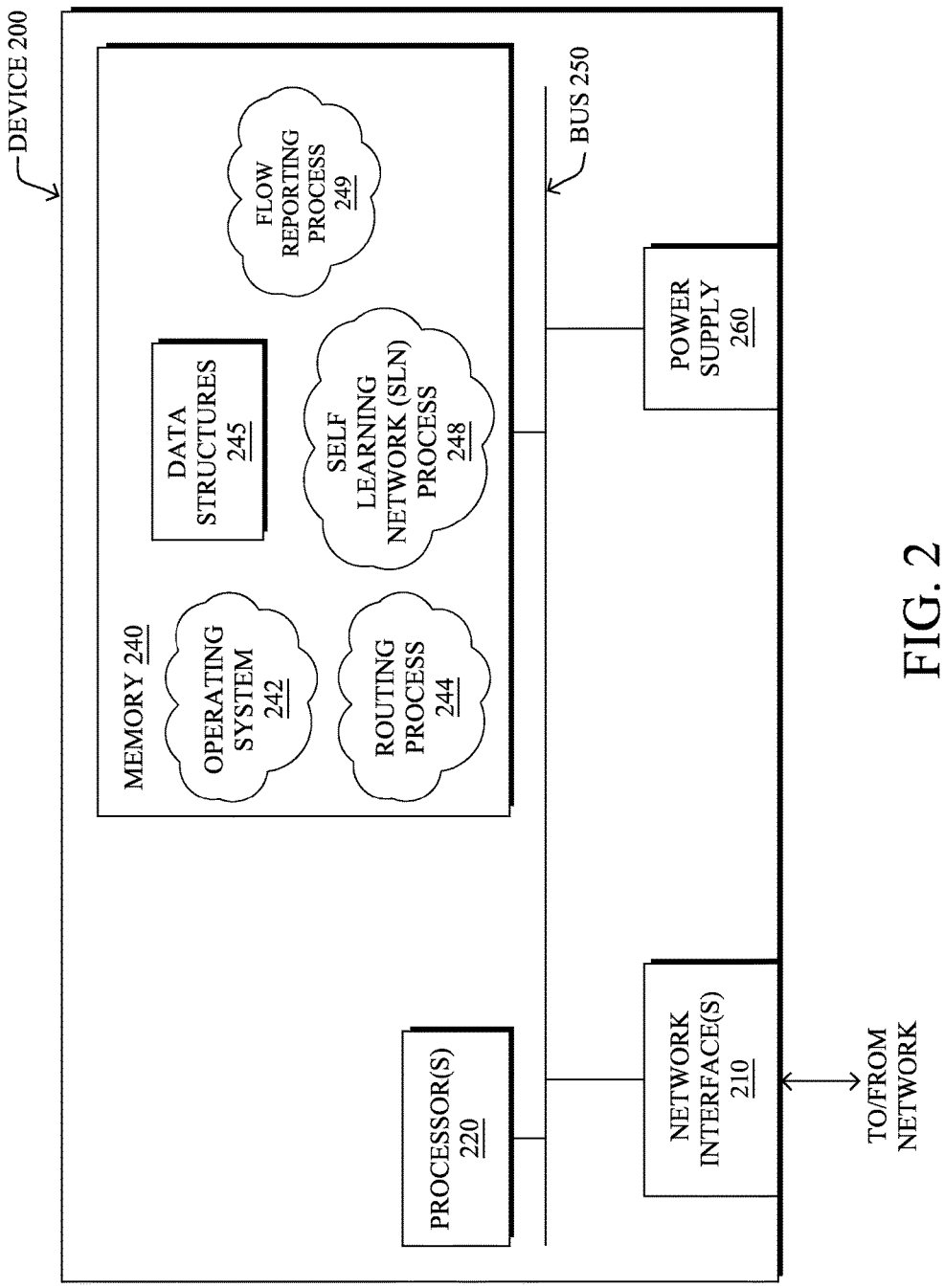
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248 and/or a flow reporting process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points).

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
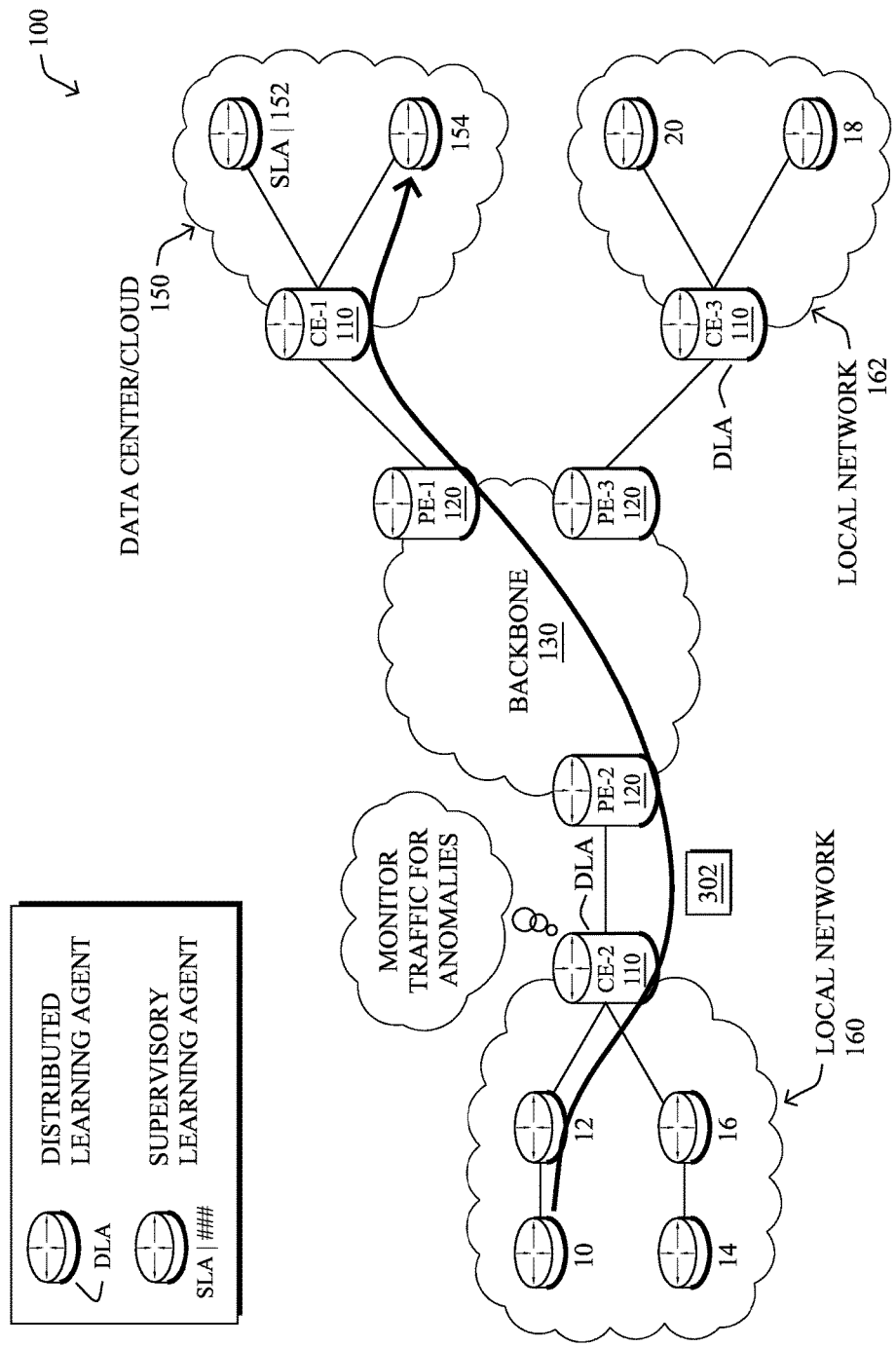
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248 and/or flow reporting 249). Such an infrastructure may include certain network devices acting as distributed learning agents (DLAs) and one or more supervisory/centralized devices acting as a supervisory learning agent (SLA). A DLA may be operable to monitor network conditions (e.g., router states, traffic flows, etc.), perform anomaly detection on the monitored data using one or more machine learning models, report detected anomalies to the SLA, and/or perform local mitigation actions. Similarly, an SLA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

As shown in FIG. 3, routers CE-2 and CE-3 may be configured as DLAs and server 152 may be configured as an SLA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SLA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

As noted above, anomaly and attack detection may be performed by capturing information about traffic flows in the network. However, a DLA used to detect anomalies may not be able to analyze traffic flows that do not traverse the device. In addition, although a DLA may typically employ a lightweight anomaly detection process (e.g., a lightweight version of SLN process 248), not every networking devices may be capable of hosting such a process. This may be the case, for example, in non-modular platforms (e.g., platforms that do not support Linux containers, etc.). Even if all of the networking devices are capable of acting as a DLA, it may still be desirable to select only a subset of devices to do so, as using too many DLAs may lead to an overly distributed (e.g., fragmented) view of the network traffic flows. Thus, some SLN implementations may employ only a limited number of DLAs per site through which only a subset of traffic flows traverse.

Information Reporting for Anomaly Detection

The techniques herein provide mechanisms that allow a DLA to receive traffic flow data regarding flows that do not traverse the DLA (e.g., certain intra-site flows, etc.). In one aspect, the DLA may learn the capabilities of each networking device in the local network with respect to flow monitoring. Notably, only certain network elements may be configured to capture and summarize information regarding traffic flows. For network devices that are not configured to capture traffic flow information, mechanisms are also disclosed herein whereby such a device may forward copies of the flow packets traversing the device to the DLA for purposes of anomaly detection. In further aspects, techniques herein are disclosed to select an optimal set of flow reporting devices (e.g., a minimal set of reporting devices, etc.). Scheduling techniques are also employed to strictly control the reporting of flow-based information to the DLA, so as not to cause congestion in the network (e.g., by imposing traffic shaping on the reported information, by recoloring traffic, by instructing a reporting device to use a different routing path, etc.).

Specifically, according to one or more embodiments of the disclosure as described in detail below, a first device in a network receives traffic flow data from a plurality of devices in the network. The traffic flow data from at least one of the plurality of devices comprises raw packets of a traffic flow. The first device selects a set of reporting devices from among the plurality of devices based on the received traffic flow data. The first device provides traffic flow reporting instructions to the selected set of reporting devices. The traffic flow reporting instructions cause each reporting device to provide sampled traffic flow data to an anomaly detection device.

Illustratively, the techniques described herein may be performed by hardware, software, and/or firmware, such as in accordance with the flow reporting process 249, which may include computer executable instructions executed by the processor 220 (or independent processor of interfaces 210) to perform functions relating to the techniques described herein, e.g., in conjunction with routing process 244 (and/or SLN process 248).

Operationally, certain network devices may be configured to distinguish traffic flows traversing the devices. In general, a networking device may identify a traffic flow based on any or all of the following: the source address of the packets of the flow, the source port of the packets, the destination address of the packets, the destination port of the packets, a Differentiated Services Code Point (DSCP) value of the packets or similar QoS information, an ingress interface identifier, or the like. In this way, a device may uniquely identify the different traffic flows flowing through the device by examining the packets in the flows (e.g., by creating a flow identifier using this information). For example, networking devices using NetFlow by Cisco Systems, Inc. or a similar technology may be operable to distinguish between different traffic flows.

A device configured to distinguish between traffic flows may also be operable to monitor and summarize various information regarding an identified traffic flow. For example, a networking device may capture and summarize flow duration metrics for a given flow, size metrics for the flow (e.g., the number of packets in the flow, the number of observed bytes of the packets, etc.), Internet Control Message Protocol (ICMP) information, or any other observable information that may be associated with a flow identifier. In some embodiments, the summarized information regarding a flow may also include information regarding the application associated with the flow. For example, a networking device may use the Network Based Application Recognition (NBAR) mechanism by Cisco Systems, Inc., or a similar technology, to associate an application with a particular flow. Such a mechanism may use deep packet inspection (DPI) and/or analyze the addresses and ports of the flow, to determine the type of data in the flow (e.g., webpage data, email data, etc.).

Figure 4A:
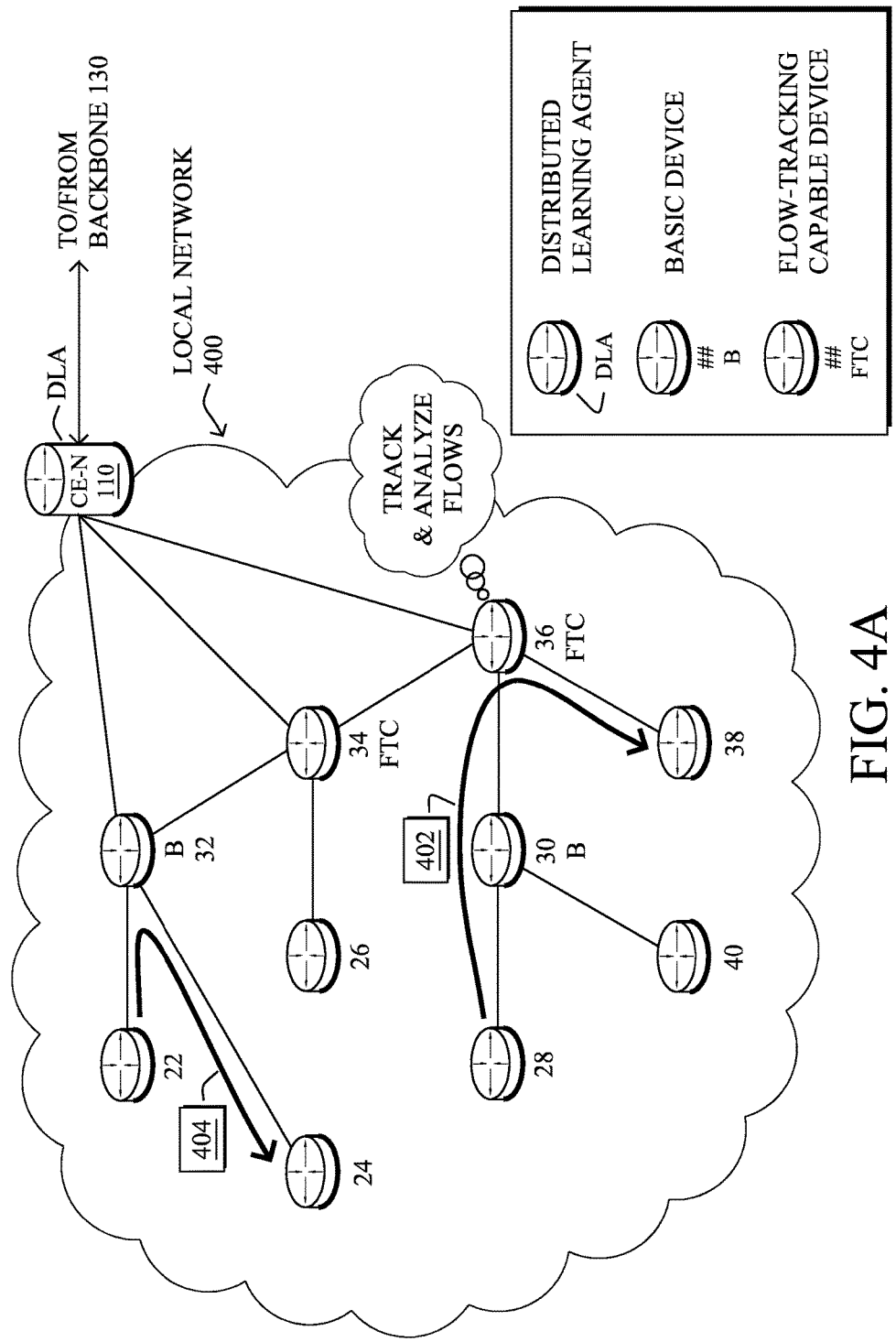
FIGS. 4A-4B illustrate an example of network devices reporting their traffic flow monitoring capabilities.
Figure 4B:
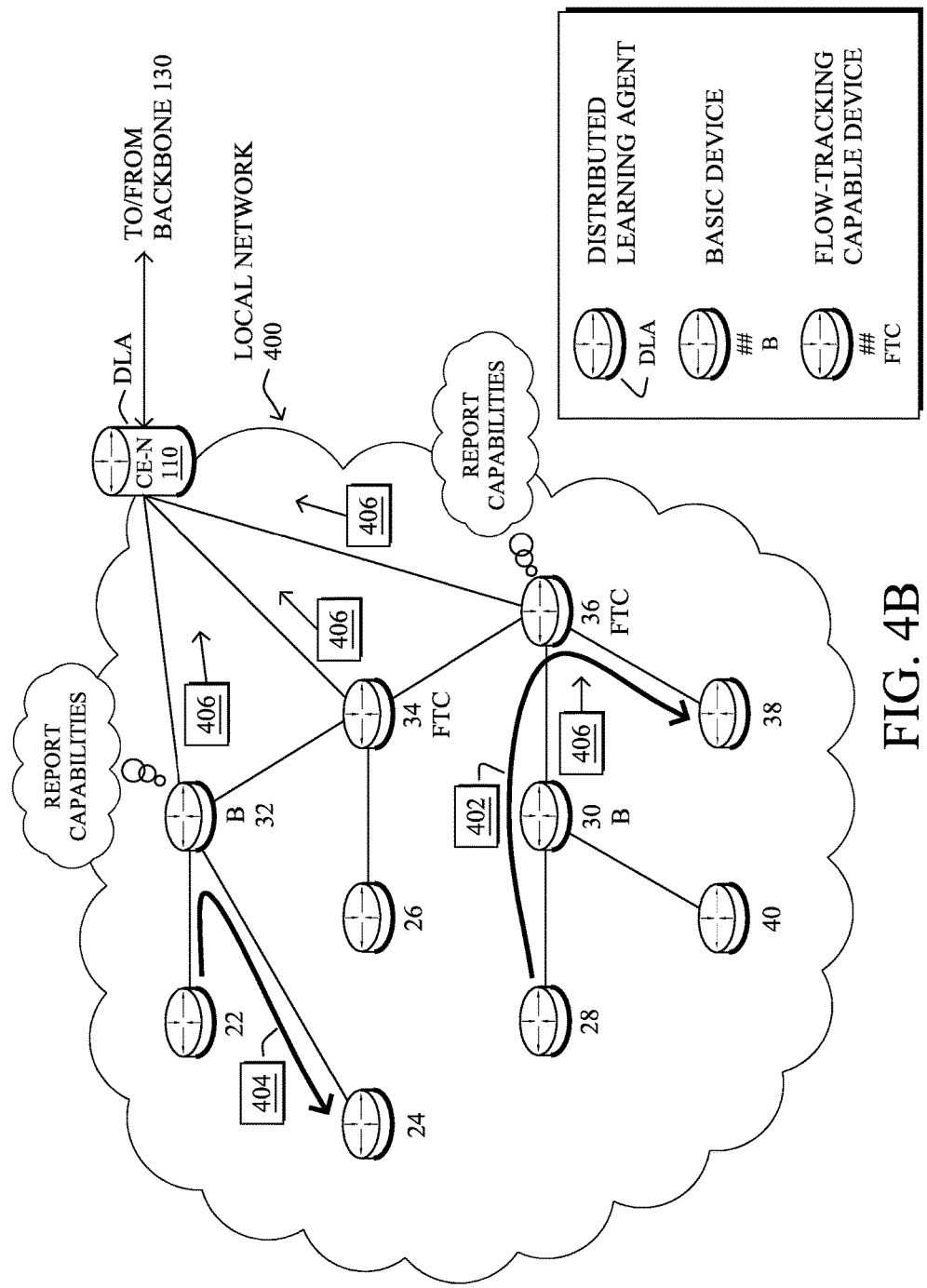

Referring now to FIGS. 4A-4B, an example is shown of network devices reporting their flow monitoring capabilities to a DLA, according to various embodiments. As shown in FIG. 4A, assume that devices 22-40 belong to a local network 400 that is connected to network backbone 130 via a CE router 110, CE-N, which may also act as a DLA for local network 400. For inter-network traffic flowing into or out of local network 400 (e.g., via the Internet, VPN link, etc.), CE-N/DLA 110 may be able to directly observe and analyze this traffic, since all such traffic directly traverses CE-N/DLA 110. In other implementations in which multiple CE routers are used at a given location, configuring two or more of these routers as DLAs would have a similar effect, e.g., the DLAs will be able to observe all inter-network/site traffic from which either the source or destination of the traffic resides outside of the local network/site (different stores, different branch offices, etc.).

While a CE router acting as a DLA may be able to directly observe all inter-network traffic, other traffic flows may not be directly observable by the device. Notably, certain intra-site/network traffic may not flow through the CE/DLA. For example, as shown, assume that device 28 sends an intra-site traffic flow 402 to device 38 via devices 30 and 36. Similarly, assume that device 22 sends intra-site traffic flow 404 to device 24 via device 32. In both cases, traffic flows 402-404 may be outside of the direct observation of CE-N/DLA 110.

To perform anomaly detection on flows outside of the direct observation of a DLA, the devices through which these flows traverse may provide information regarding the flows back to the DLA. For example, as noted above, a given networking device may be configured to generate a summarized traffic flow record for an observed traffic flow. However, not every device in the network may have this capability. For example, as illustrated in the example of FIG. 4A, assume that devices 34 and 36 are flow-tracking capable (FTC) devices (e.g., by using NetFlow, NBAR, or similar technologies). Thus, device 36 may track and analyze the flows that traverse device 36, such as traffic flow 402. However, other devices in local network 400 may be basic networking devices, denoted "B" in FIG. 4A. Such devices may not have the same mechanisms to identify and generate summarized records for their traffic flows.

In one aspect of the techniques herein, a discovery mechanism is introduced that enables a DLA to discover the capabilities of each networking device in a local network/site. For example, as shown in FIG. 4B, devices 30-36 may provide capability data 406 to CE-N/DLA 110. In general, capability data 406 is indicative of whether or not a given device is operable to identify and analyze traffic flows. Although described primarily with respect to a routed topology (e.g., Layer 3), similar techniques may be applied to switched environments (e.g., Layer 2), using, for example, spanning trees or a protocol such as TRILL (e.g., by using a Layer 3 routing protocol for Layer 2 networks, which also supports VLAN).

Capability data 406 may be provided to CE-N/DLA 110 on either a pull basis (e.g., in response to a request for the data from CE-N/DLA 110) or on a push basis (e.g., without first receiving a request for the data). In some embodiments, capability data 406 may be included in a custom type-length-value (TLV) in charge of encoding the capability of each device in the L2/L3 domain (e.g., as either a DLA, FTC, or basic device). In some cases, capability data 406 may also include additional information such as identifiers for the flow tracking mechanism(s) used by a given device. For example, the capability data 406 may include information regarding the type and/or version of the flow tracking mechanism used by the device (e.g., Netflow v5, Netflow v9, etc.), support for application recognition (e.g., NBAR, etc.), or the like. In some embodiments, capability data 406 may be included in one or more custom TLVs encapsulated in a routing protocol message such as an OSPF Opaque TLV of type 10 (or 11 if spanning across OSPF areas is required). In another embodiment, capability data 406 may be encapsulated in an IS-IS label switched path (LSP) message. This allows the DLA to retrieve the full topology of the site/local network (e.g., in the form of a link state database), augmented with the information regarding which devices in the network can host additional DLAs, which devices can track and report on traffic flows, and/or which devices are basic devices unable to distinguish traffic flows.

Figure 5A:
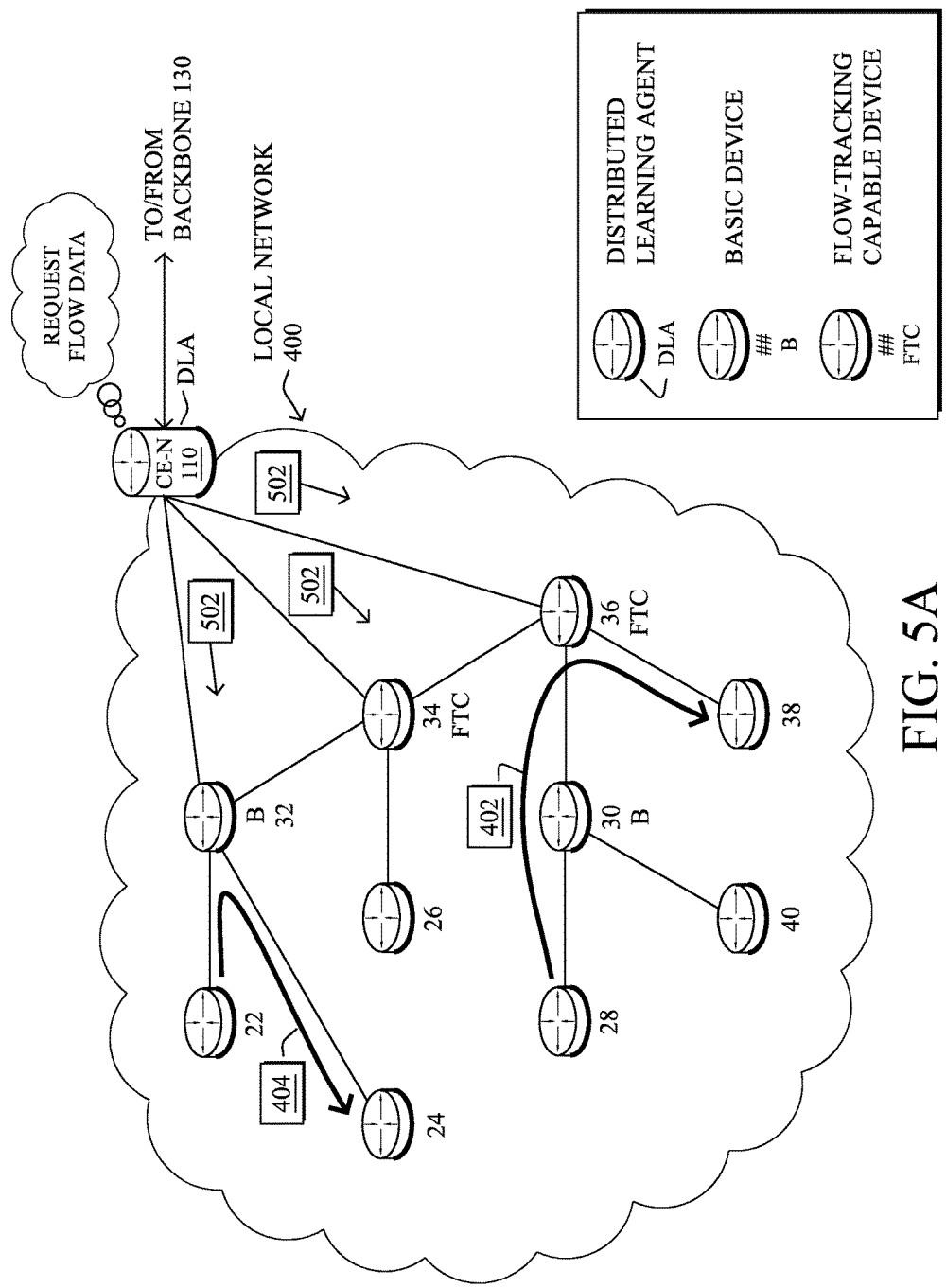
FIGS. 5A-5B illustrate examples of network devices providing traffic flow data.
Figure 5B:
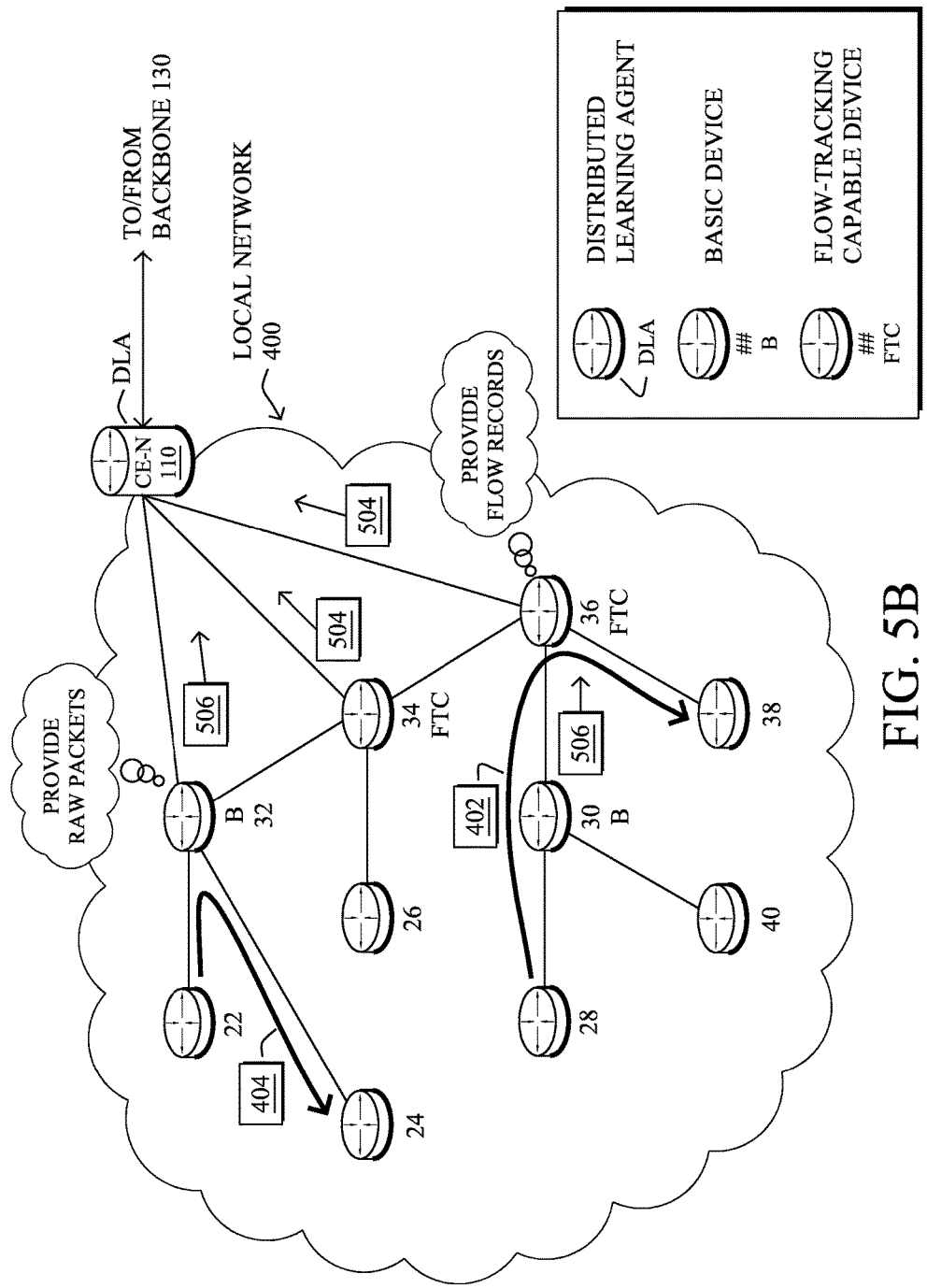

Referring now to FIGS. 5A-5B, examples of network devices providing traffic flow data to a DLA are shown, according to various embodiments. In some cases, instructing all network devices to provide traffic flow data to the DLA may be impractical due to constraints on the resources of the network. Accordingly, the DLA may determine which traffic flows should be reported to the DLA, thereby allowing the DLA to perform anomaly detection on all relevant traffic within the local site/network. For purposes of illustration, let 'T' represent the L2 or L3 network topology retrieved by the DLA where $\{FTC_1, \ldots, FTC_i\}$ is the set of flow tracking capable devices and $\{B_1, \ldots, B_j\}$ is the set of basic devices that are not capable of flow tracking. In some embodiments, the basic devices in $\{B_1, \ldots, B_j\}$ may still be of use to the DLA for purposes of anomaly detection by forwarding sampled copies of traffic flow packets to the DLA for further analysis, as detailed below. In various embodiments, the DLA may attempt to determine the minimum subset of all devices carrying intra-site traffic for which flow-related information is required by the DLA, to have full coverage of all intra-site traffic for purposes of anomaly detection.

As shown in FIG. 5A, CE-N/DLA 110 may send a request 502 for traffic flow data to each of the devices in local network 400. Request 502 may be a custom unicast message sent to each device individually or, alternatively, a multicast message sent to a multicast group used for SLN-based communications. In some cases, request 502 may be of the form flow_req(attributes) where the attributes parameter(s) specify a period of time over which a device is to track and/or report flow data, a set of criteria for the traffic of interest (e.g., traffic that matches the specified attributes, such as traffic associated with a particular application), whether the flow data should be reported with low priority, whether the flow data should be reported using output shaping, a specific reporting schedule for each device (e.g., to avoid a sharp increase in traffic sent to the DLA, especially when packet copies are sent to the DLA by basic devices), combinations thereof, or the like.

As shown in FIG. 5B, in response to receiving a request 502 from the DLA, FTC devices 34 and 36 may identify their respective traffic flows, summarize the flows in traffic flow records 504, and provide the summarized flow traffic flow records 504 back to the DLA. Such a record may include flow identifier information (e.g., the source and destination addresses/ports of the flows, etc.), application type information (e.g., HTTP traffic, email traffic, etc.), and/or any observed or calculated metrics regarding the flows (e.g., flow duration metrics, flow size metrics, etc.). For example, a flow record 504 provided by FTC device 34 to CE-N/DLA 110 may identify traffic flow 402 as being sent by device 28 to device 38, the duration of flow 402 or similar metrics, the application type associated with traffic flow 402, etc.

In contrast to FTC devices, basic devices are not operable to identify and summarize their respective traffic flows. However, according to various embodiments, the basic devices may still provide traffic flow data back to the DLA in the form of copied packets, in response to receiving a request from the DLA for traffic flow data (e.g., request 502). For example, as shown, traffic flow data 506 sent by basic device 32 to CE-N/DLA 110 may include copies of raw packets from traffic flow 404. In other words, request 502 sent to basic device 32 may cause device 32 to enable a packet copying mechanism and begin forwarding raw packets from its traffic flows to CE-N/DLA 110 for a period of time specified in request 502. In other words, CE-N/DLA 110 may base requests 502 on the capabilities of the various devices, as indicated in capability data 406 (e.g., to request traffic flow records from FTC devices, to enable packet copying at basic devices, etc.).

In various embodiments, packet copying mechanisms used by basic devices may allow for the analysis of traffic passing through switch ports by sending a copy of that traffic to another port on the switch to which the DLA is connected. For example, the basic devices may use the Switched Port Analyzer (SPAN) mechanism of Cisco Systems, Inc. or a similar mechanism, to provide raw packet copies to the DLA. Such a packet copying mechanism may also be configured to allow remote control over the device, to enable remote monitoring of multiple switches across the network (e.g., using the Remote SPAN mechanism of Cisco Systems, Inc., etc.). The traffic for each remote session may be carried over a user-specified virtual LAN (VLAN) through a reflector port and then forwarded over trunk ports by participating intermediate switches to the destination switch, which then mirrors the packets through the destination port (e.g., to the DLA). Thus, to enable the forwarding of traffic flow packets back to the DLA, request 502 sent from the DLA may also indicate a packet-copying session identifier, the source port (s) from which the packets are to be copied, traffic flow direction(s) (e.g., receive, transmit, or both), the reflector port, the destination VLAN for the copied packets, the destination port for the packet copies, and/or any other request attributes (e.g., a sampling schedule, etc.) to the source, intermediate, and destination switches.

When no request attributes are specified in request 502, the packet copying mechanism of a basic device may be defaulted to remain active until specified otherwise for all ports, excluding any destination or reflector ports. In another embodiment, request 502 may include attributes that specify which types of traffic should be duplicated based on a match to specified criteria in request 502. For example, traffic flow data 506 from a basic device may include raw packets copied based on an access list, class-map, traffic flow direction, etc. specified in request 502. In another embodiment, only a subset of the packets of a traffic flow may be copied, based on a parameter in request 502. For example, a basic device may only send copies of every nth number of packets as part of traffic flow data 506 using a decreased sampling frequency, to reduce processing overhead incurred by the packet duplication. In yet a further embodiment, the raw packets in traffic data 506 from a basic device may be provided according to a reporting/sampling schedule indicated in request 502, using a low traffic priority specified in request 502, and/or by employing traffic shaping on the provided traffic data 506, as requested in request 502.

Referring now to FIGS. 6A-6E, examples of a flow reporting strategy being configured in a network is shown, according to various embodiments. Once the DLA receives the summarized traffic flow records from the FTC devices and/or the raw packets from the basic devices, the DLA may use this information to devise a flow reporting strategy that would allow the DLA to perform anomaly detection on the intra-site traffic flows. In some embodiments, the DLA may standardize the received traffic flow data by performing flow tracking on the raw packets received from the basic devices. For example, the DLA may analyze the raw packets in traffic flow data 506 to generate and store summarized traffic flow records for the traffic flow data 506.

Figure 6A:
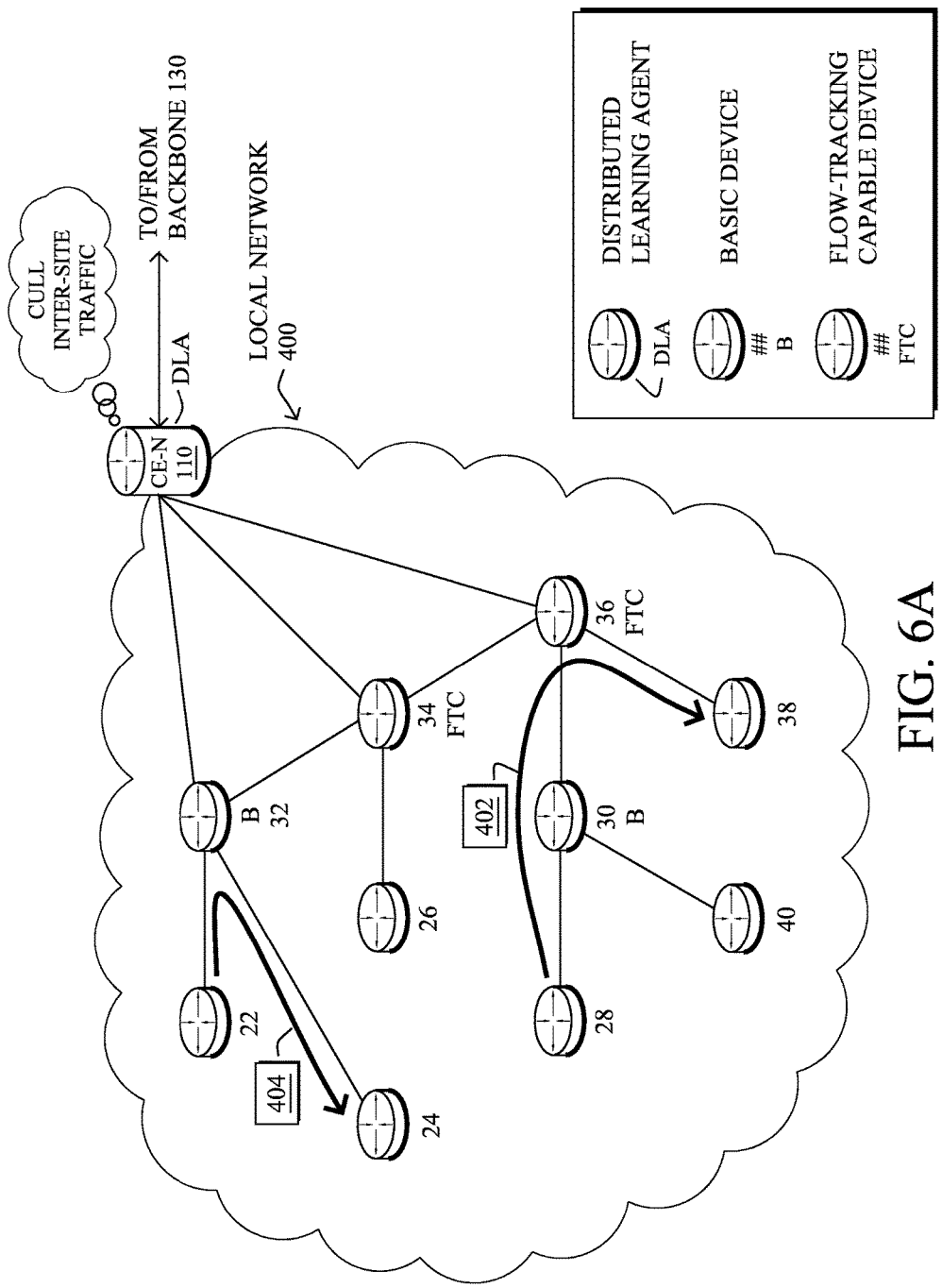
FIGS. 6A-6E illustrate examples of a flow reporting strategy being configured in a network.

As shown in FIG. 6A, CE-N/DLA 110 may begin formulating the flow reporting strategy by first culling any inter-site traffic flows in its stored flow records from further consideration. Notably, since CE-N/DLA 110 also provides the interface between the local site/network 400 and network backbone 130 (e.g., the Internet, MPLS VPN, etc.), CE-N/DLA 110 may be able to directly observe and analyze any such inter-site traffic flows.

Figure 6B:
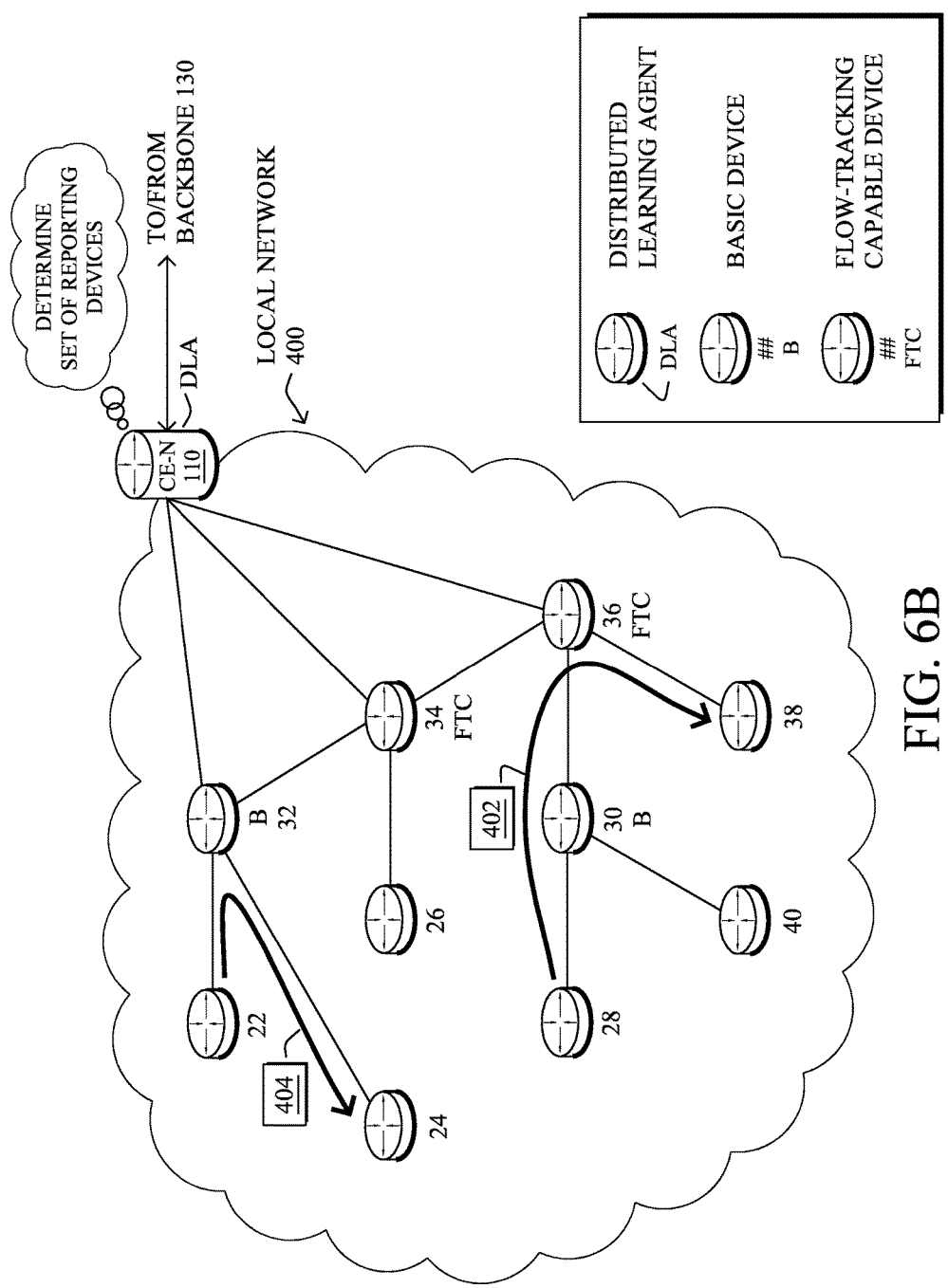

As shown in FIG. 6B, CE-N/DLA 110 may then determine a set of reporting devices $S=\{D_1, D_2, \ldots, D_k\}$ that should report traffic flow data to CE-N/DLA 110 for purposes of inter-site anomaly detection. Such reporting devices may include FTC devices that would report summarized traffic flow records to CE-N/DLA 110 and/or any basic devices that would provide raw copies of traffic flow packets to CE-N/DLA 110, according to the flow reporting strategy. In some embodiments, CE-N/DLA 110 may select the set S of reporting devices such that a minimum number of devices is selected, while still providing traffic flow data regarding all intra-site traffic to CE-N/DLA 110. For example, assume that all traffic flows that traverse basic device 30 also traverse FTC device 36. In such a case, CE-N/DLA 110 may only include FTC device 36 in the set S of reporting devices.

In some cases, there may be no FTC devices within the local site/network or within a particular portion of the local network. This may result in a potentially high rate of traffic being sent to the DLA, due to the copied packets. To reduce the processing load on the DLA device, the DLA may determine that one or more other devices in the local network should analyze raw packets from the basic devices. In one embodiment, the DLA may cause a device in a branch to spin up a virtual machine dedicated to tracking and summarizing traffic flows. In another embodiment, if there are multiple routers in the site, one of the routers may be given the responsibility of being a dedicated FTC device to receive and summarize all copied traffic flow packets.

Figure 6C:
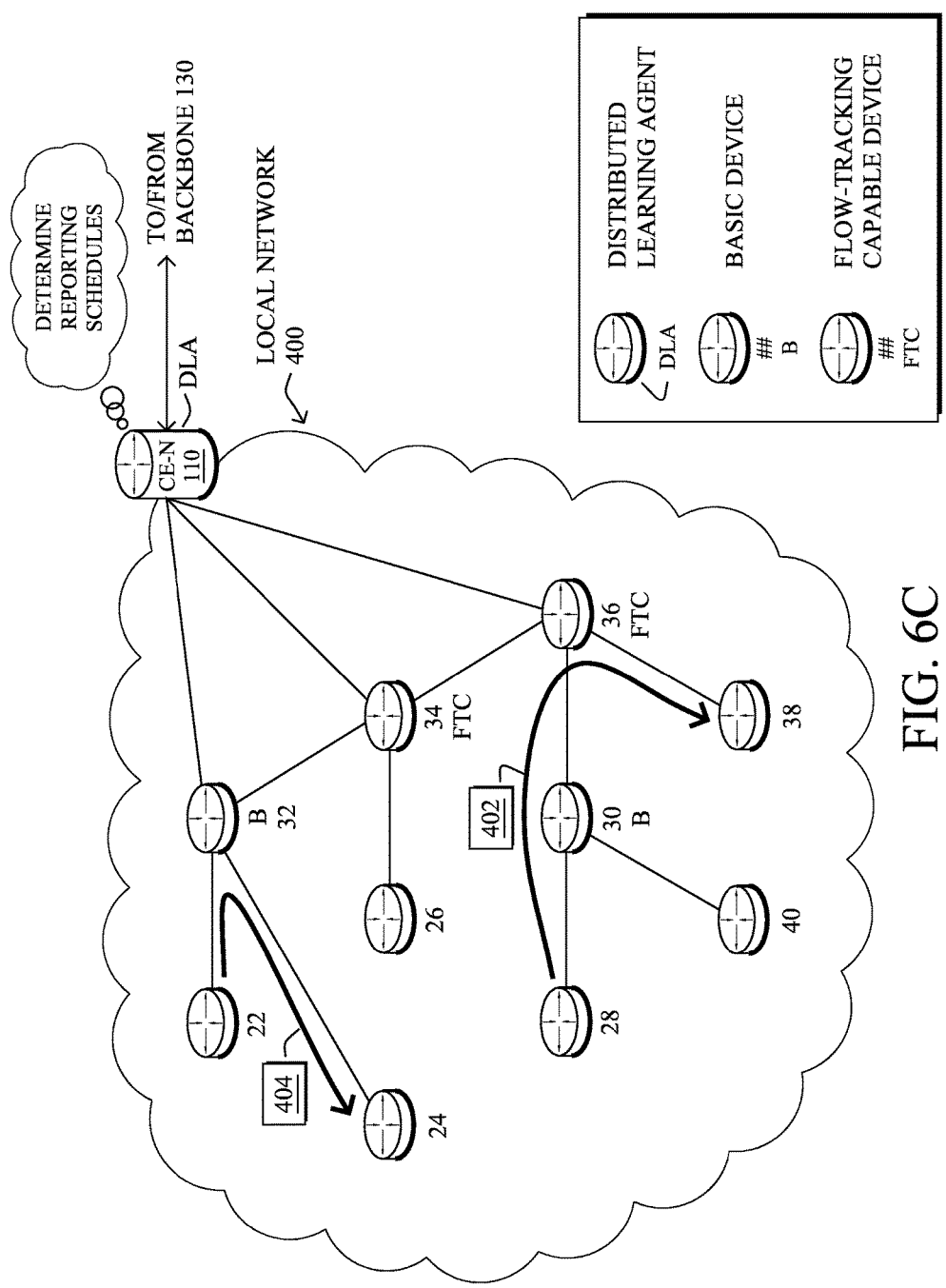

As shown in FIG. 6C, CE-N/DLA 110 may determine when each device in the set of reporting device should report traffic flow data to CE-N/DLA 110 for purposes of anomaly detection. In one embodiment, CE-N/DLA 110 may determine a frequency at which each reporting device should send summarized traffic flow records or copied traffic flow packets to CE-N/DLA 110 for inspection. In another embodiment, CE-N/DLA 110 may determine reporting schedules for the reporting devices that avoid network congestion, based on the predicted amount of reporting traffic, the topology T, and the observed link utilizations in local network 400.

Figure 6D:
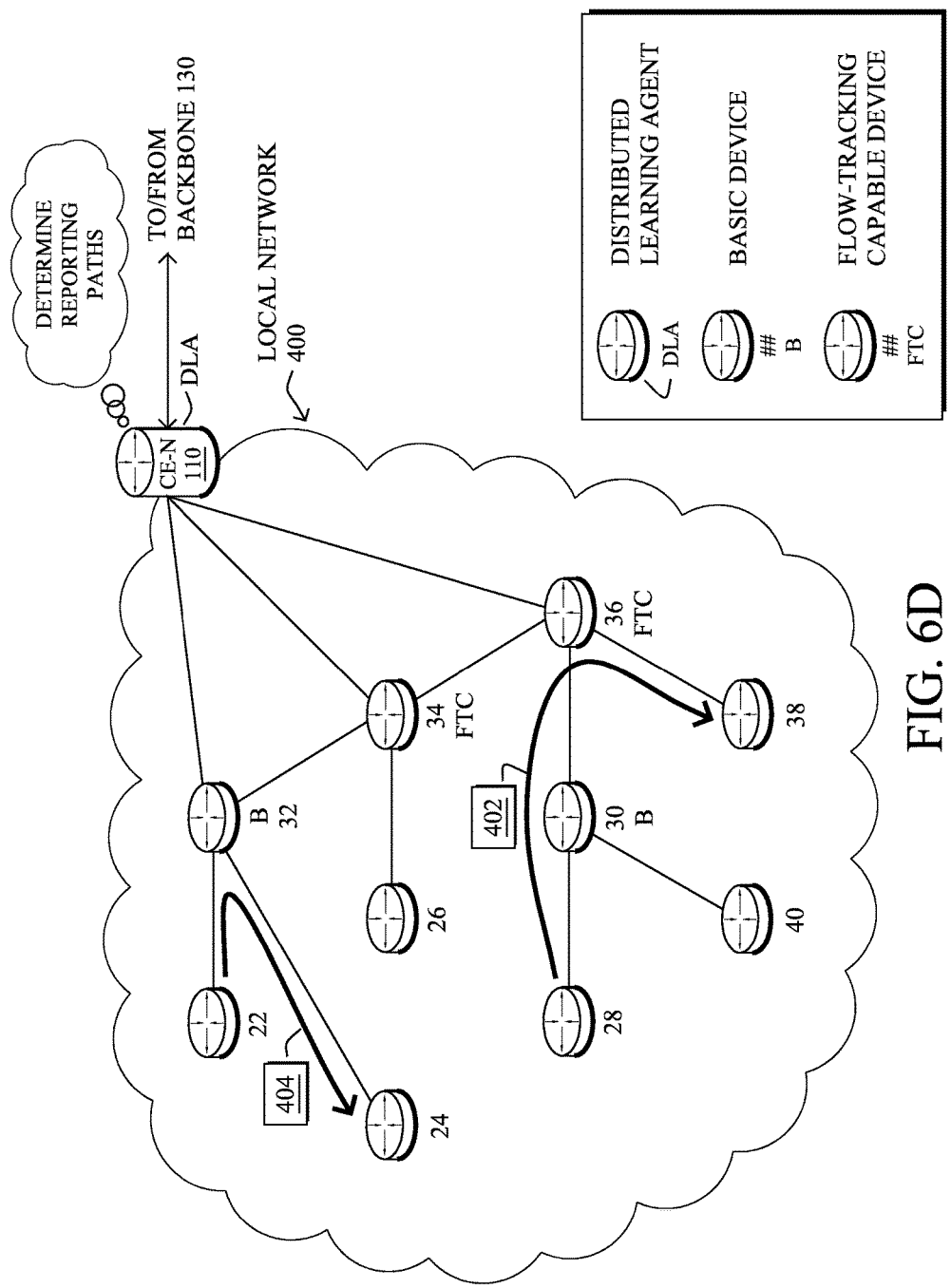

As shown in FIG. 6D, CE-N/DLA 110 may determine a set of reporting paths to be used by the reporting devices when sending the summarized traffic flow reports or copied flow packets to CE-N/DLA 110. Indeed, although various techniques may be used to reduce the overhead of sending the traffic flow data to CE-N/DLA 110 for anomaly detection (e.g., by adjusting the timing of the reporting, etc.), network congestion may still occur in LANs that include high speed links. In some embodiments, the DLA may keep track of historical observations of the traffic flows in the local site/network and compute an estimate of the traffic overhead due to these flows in light of the link utilization in the local network. In one embodiment, CE-N/DLA 110 may do so by requesting congestion-related information in request 502. For example, CE-N/DLA 110 may request information regarding the interface-based counters of the various devices, to report the level of utilization of a device's ports used by the L2/L3 routing protocols to provide the traffic flow data to CE-N/DLA 110. Alternatively, CE-N/DLA 110 may receive such information from an NMS (e.g., one of servers 152-154, etc.) or from the routing protocol itself. Notably, some routing protocols support protocol extensions to advertise routing adjacencies, address and link utilization levels, etc.

Once the DLA determines an estimate of the amount of traffic that will result from the reported traffic flow data, the DLA may determine whether the estimated traffic overhead added to the regular traffic would trigger potential congestion along the links in the local network. If so, the DLA may compute an alternate path (e.g., a traffic engineered path), to be used by a device when reporting traffic flow data to the DLA. In other words, an FTC or basic device selected by the DLA as a reporting device may send the reported traffic flow data to the DLA along a different path than the one computed by the L2/L3 routing protocol. If an alternate path is computed, the request message (e.g., request 502) and/or any flow reporting instructions sent as part of the flow reporting strategy may be further augmented to specify the reporting path.

Figure 6E:
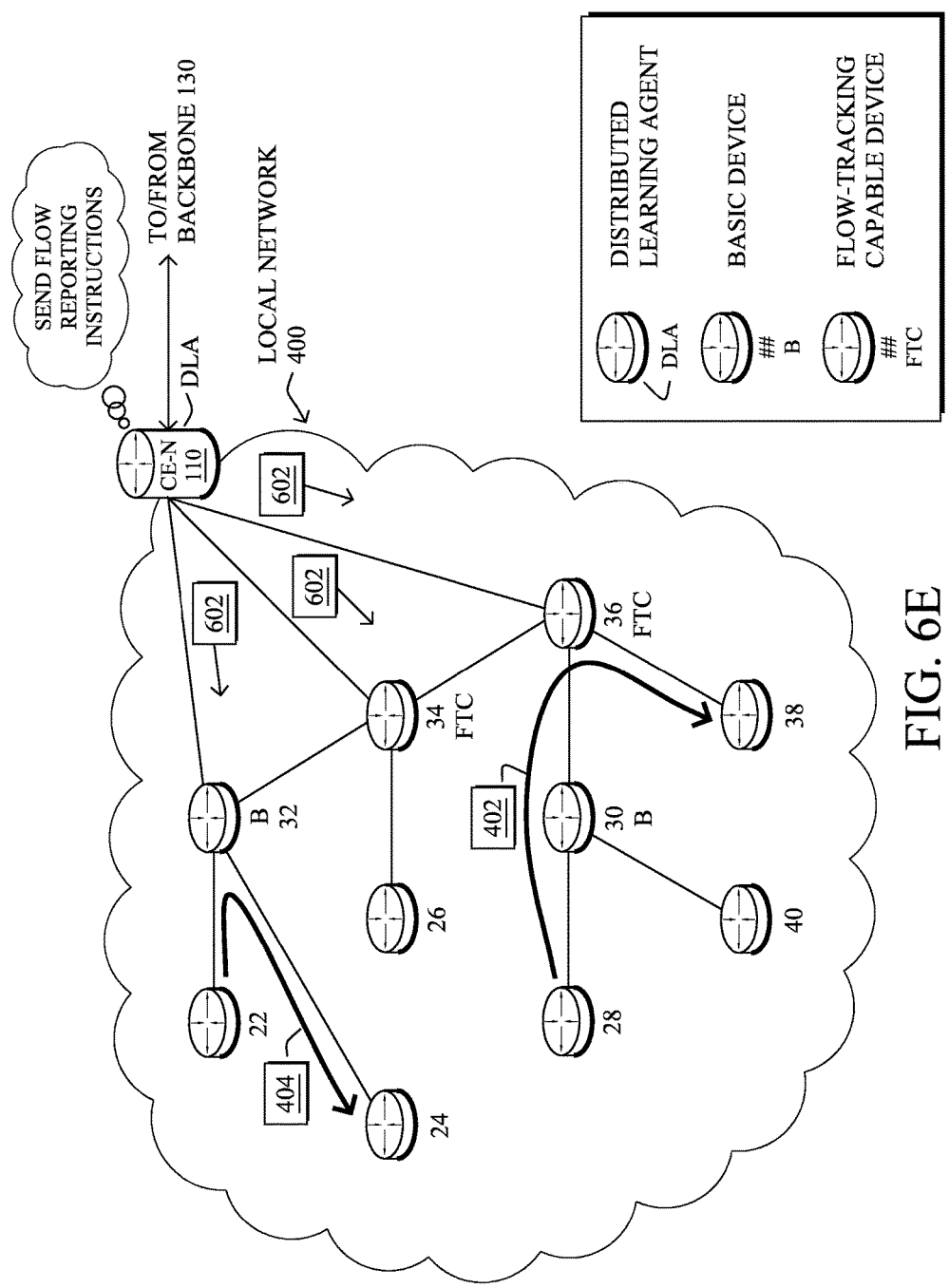

As shown in FIG. 6E, once CE-N/DLA 110 determines the traffic flow reporting strategy to be used in local network 400, it may specify the corresponding set of actions to be taken by the devices, so that traffic flow data may be provided to the DLA for purposes of performing anomaly detection on the intra-site traffic. For example, CE-N/DLA 110 may send a traffic flow reporting instruction 602 to the devices in local network 400 that were selected as reporting devices. Traffic flow reporting instruction 602 sent to a reporting device may, for example, specify a reporting schedule (e.g., a reporting frequency, a scheduled reporting time, etc.), a reporting path (e.g., an alternate path via which the reported traffic flow data is to be sent), an aggregation device (e.g., to consolidate copied flow packets into traffic flow records at a device other than the DLA), parameters that control how the reported traffic flow data is to be sent (e.g., a priority, traffic engineering parameters, etc.), parameters that control which types of traffic flows are to be reported to the DLA (e.g., based on application type, ports or addresses of the source/destination, etc.), or any other parameters that control how and when a reporting device provides traffic flow data to the DLA (e.g., either summarized flow records or raw packet copies).

In various embodiments, the techniques herein may be repeated any number of times to dynamically adjust the traffic flow reporting strategy used in the network for purposes of anomaly detection. For example, the DLA may request flow data from all devices in the local site ever X hours, days, etc., to discover new flows faster (e.g., where X is lower than the reporting frequency used by the reporting strategy). Alternately, or in addition thereto, a given network device (e.g., an FTC device, etc.) may send traffic flow data to the DLA in an unsolicited manner, if the device determines that a new flow has appeared.

Figure 7:
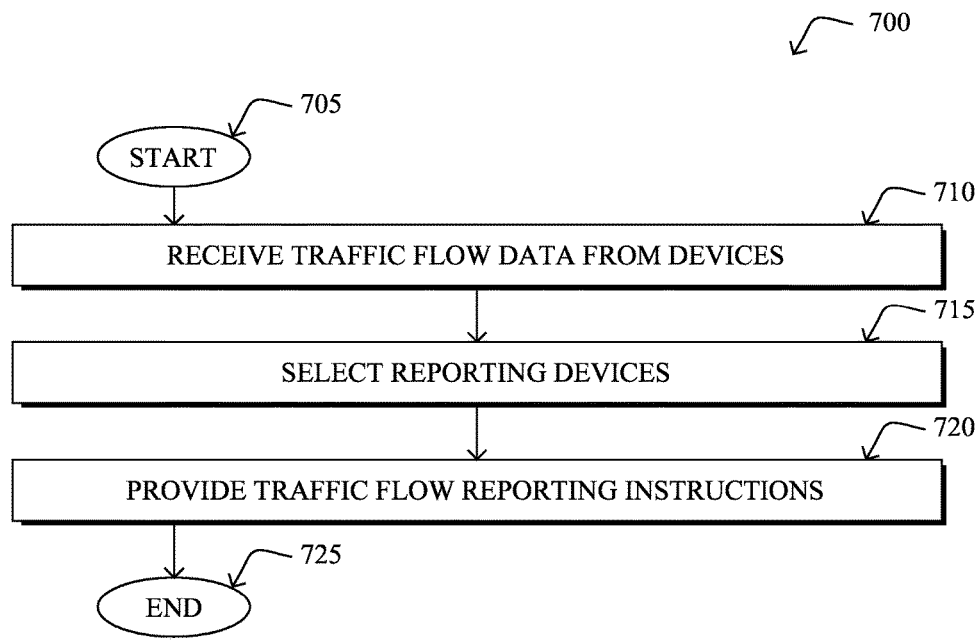
FIG. 7 illustrates an example simplified procedure for implementing a traffic flow reporting strategy.

FIG. 7 illustrates an example simplified procedure for determining a traffic flow reporting strategy in a network, in accordance with various embodiments herein. Procedure 700 may be performed, for example, by a DLA or other device configured to control the traffic flow reporting strategy used in a network for purposes of anomaly detection. Procedure 700 may begin at step 705 and continue on to step 710 where, as described in greater detail above, a first device receives traffic flow data from a plurality of devices in the network. The traffic flow data may be of different forms, depending on the capabilities of the devices. For example, the plurality of devices may include devices that are configured to identify and summarize traffic flows and include the summarized traffic flow records in the received traffic flow data. In other embodiments, one or more of the plurality of devices may be a basic device that is not operable to track traffic flows. Such a basic device may instead provide copies of traffic flow packets to the first device for further analysis.

At step 715, the first device selects a set of reporting devices from among the plurality of devices based on the received traffic flow data, as described in greater detail above. In some embodiments, the first device may select the set of reporting devices to include a minimal number of devices from the plurality, while still providing sufficient insight into the traffic flows within the local network. For example, the first device may exclude a particular device from the set of reporting devices if the traffic flow data from the particular device is redundant with traffic flow data from a different device. For basic devices that report only raw packets to the first device, the first device may, in one embodiment, convert the raw packets into summarized traffic flow records, to identify candidate reporting devices (e.g., based on the corresponding flows). In further embodiments, the first device may select the set of reporting devices by first excluding any inter-site/network traffic flows from consideration, so that only intra-site/network traffic flows are reported to the first device.

At step 720, as detailed above, the first device provides traffic flow reporting instructions to the selected set of reporting devices. In general, the first device may generate a traffic flow reporting instruction such that the impact of the flow reporting on the network is minimized. In one embodiment, the instruction may include flow reporting schedules/frequencies determined by the first device to reduce network congestion. In another embodiment, the instruction may specify a reporting path to be used by a particular reporting device. For example, the first device may analyze reported link information from the network devices (e.g., a history of flow reports), routing information from the routing protocol, information from an NMS, or the like, to identify alternative routing paths that may alleviate network contention due to the flow reporting. In further embodiments, a flow reporting instruction sent to a particular reporting device may cause the reporting device to send raw packets to an FTC device, so that the corresponding flows can be identified from the packets. Thus, the traffic flow reporting instructions may cause the reporting devices to implement a flow reporting strategy whereby the reporting devices send sampled traffic flow data to an anomaly detection device for purposes of anomaly detection.

In some embodiments, the first device may be the anomaly detection device and may detect an anomaly in the network using the sampled traffic data received from the reporting devices, as described in greater detail above. Notably, the sampled traffic data may include all packets or traffic flow records over a given time period or only a subset of the available data (e.g., every nth packet, etc.). The first device may detect the anomaly, for example, by comparing the traffic flow data to a learning machine model (e.g., a clustering model, etc.), an analytic model (e.g., a mathematical model), or any other model configured to determine whether the reported traffic flow data is indicative of an anomaly in the network. Procedure 700 then ends at step 725.

Figure 8:
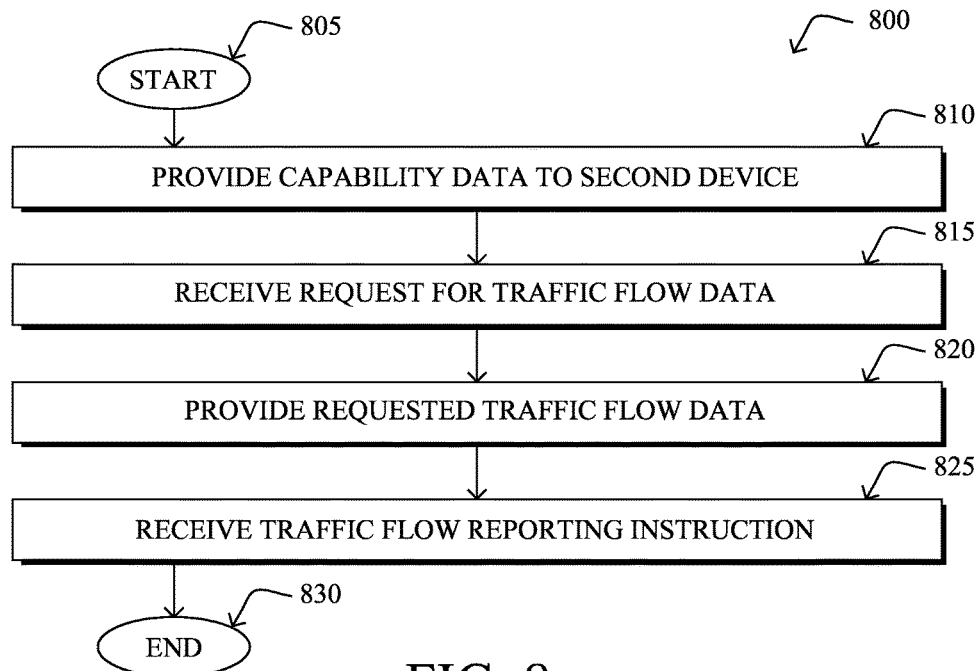
FIG. 8 illustrates an example simplified procedure for receiving a traffic flow reporting instruction.

FIG. 8 illustrates an example simplified procedure for receiving a traffic flow reporting instruction, in accordance with one or more embodiments described herein. For example, procedure 800 may be performed by a network device in communication with a DLA or other device configured to determine a traffic flow reporting strategy for purposes of anomaly detection. Procedure 800 may begin at step 805 and continue on to step 810 where, as described in greater detail above, a first device in a network may provide capability data to a second device (e.g., an anomaly detection device, etc.). The capability data may, for example, identify whether or not the first device is able to provide summarized traffic flow records to the anomaly detection device. If the first device is capable of providing traffic flow records, the first device may indicate so as part of the capability data and may include additional information such as the type or version of its traffic flow tracking mechanism (e.g., whether the device is able to distinguish between different applications, etc.) in the capability data. Conversely, if the first device is a basic device that is not operable to track flows, it may indicate in capability data that can instead provide raw traffic flow packet copies. In such a case, the capability data may include any additional information regarding the packet copying mechanism used by the device (e.g., the ports used, etc.). In various embodiments, the first device may provide the capability data to the second device either on a push basis or on a pull basis.

At step 815, as detailed above, the first device receives a request for traffic flow data from the second device. Such a request may indicate the types of traffic flow data to report (e.g., based on application type, based on ports or addresses, etc.). The request may also indicate the times during which the first device is to generate the traffic flow data and/or provide the traffic flow data back to the second device, a priority to be assigned to the reported traffic flow data, traffic shaping parameters for the reported flow data, or the like.

At step 820, as described in greater detail above, the first device provides the requested traffic flow data to the second device. The provided traffic flow data may include summarized traffic flow records or, alternatively, include raw traffic flow packets copied by the first device. In one embodiment, the traffic flow data may also include additional information such as the ports or addresses used by the first device for purposes of forwarding traffic (e.g., to allow the anomaly detection device to identify alternative reporting paths). In response to receiving the provided traffic flow data, the second device may use the traffic flow data to determine a traffic flow reporting strategy and generate any corresponding traffic flow reporting instructions for the selected reporting devices in the network.

At step 825, the first device may receive a traffic flow reporting instruction that causes the first device to provide sampled traffic flow data to an anomaly detection device in the network. Such sampled data may include either raw packets that are copied from the sampled traffic flow or summarized traffic flow records, depending on the capabilities of the first device. In one embodiment, the instruction may specify a reporting schedule (e.g., an indication as to when the first device is to send the sampled traffic flow data to the anomaly detection device). In other embodiments, the instruction may specify a reporting path that the first device is to use when reporting the sampled traffic flow data to the anomaly detection device (e.g., a path that differs from the routing path selected by the routing protocol in use). In further embodiments, the instruction may cause the first device to provide raw traffic flow packets to the anomaly detection device via another network device configured to generate traffic flow records from the packets. Using the sampled traffic flow data, the destination anomaly detection device may determine whether the corresponding traffic flows are anomalous, such as during a network attack. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow a DLA of a SLN to detect anomalies (e.g., DDoS attacks, etc.) in traffic that does not transit through the DLA device, thereby expanding the scope of the anomaly detection to include intra-site traffic. The techniques herein also support networks with devices of varying capabilities, such devices that support traffic flow monitoring/tracking, basic devices that do not support traffic flow tracking but use a packet copying mechanism, etc.

While there have been shown and described illustrative embodiments that provide for information reporting for anomaly detection, it is to be understood that various other adaptations and modifications may be made within the spirit and scope of the embodiments herein. For example, while certain embodiments are described herein whereby the DLA determines the flow reporting strategy to be used in the local network, any other device may also determine the strategy, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   providing, by a first device in a network, capability data to a second device in the network, wherein the capability data is indicative of whether the first device is operable to generate summarized traffic flow records;
   receiving, at the first device, a request for traffic flow data from the second device based on the capability data;
   providing, by the first device, the requested traffic flow data to the second detection device, in response to receiving the request for the traffic flow data; and
   receiving, at the first device, a traffic flow reporting instruction from the second device based on the traffic flow data provided to the second device, wherein the traffic flow reporting instruction causes the first device to report sampled traffic flow data to an anomaly detection device.

2. The method as in claim 1, wherein the capability data indicates that the first device is not operable to generate summarized traffic flow records, and wherein the sampled traffic flow data provided to the anomaly detection device comprises raw traffic flow packets copied by the first device.

3. The method as in claim 1, wherein the traffic flow reporting instruction indicates a reporting schedule to be used by the first device when reporting the sampled traffic flow data.

4. The method as in claim 1, wherein the traffic flow reporting instruction indicates a reporting path to be used by the first device when reporting the sampled traffic flow data, and wherein the reporting path differs from a routing path computed by a routing protocol between the first device and the anomaly detection device.

5. The method as in claim 1, wherein the traffic flow reporting instruction causes the first device to report the sampled traffic flow data to the anomaly detection device via another network device configured to aggregate the sampled traffic flow data into a summarized traffic flow report.

6. An apparatus, comprising:
   one or more network interfaces to communicate with a network;
   a processor coupled to the one or more network interfaces and configured to execute a process; and
   a memory configured to store the process executable by the processor, the process when executed operable to:
      provide capability data to a device in the network, wherein the capability data is indicative of whether the apparatus is operable to generate summarized traffic flow records;
      receive a request for traffic flow data from the device based on the capability data;
      provide the requested traffic flow data to the device, in response to receiving the request for the traffic flow data; and
      receive a traffic flow reporting instruction from the device based on the traffic flow data provided to the device, wherein the traffic flow reporting instruction causes the apparatus to report sampled traffic flow data to an anomaly detection device.

7. The apparatus as in claim 6, wherein the capability data indicates that the first device is not operable to generate summarized traffic flow records, and wherein the sampled traffic flow data provided to the anomaly detection device comprises raw traffic flow packets copied by the apparatus.

8. The apparatus as in claim 6, wherein the traffic flow reporting instruction indicates a reporting schedule or a reporting path to be used by the apparatus when reporting the sampled traffic flow data.

9. The apparatus as in claim 6, wherein the traffic flow reporting instruction causes the apparatus to report the sampled traffic flow data to the anomaly detection device via another network device configured to aggregate the sampled traffic flow data into a summarized traffic flow report.

\* \* \* \* \*